(12) United States Patent
Tanaka

(10) Patent No.: US 7,187,385 B2
(45) Date of Patent: Mar. 6, 2007

(54) IMAGE PROCESSING APPARATUS

(75) Inventor: Satoru Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 251 days.

(21) Appl. No.: 10/092,446

(22) Filed: Mar. 8, 2002

(65) Prior Publication Data

US 2002/0126311 A1    Sep. 12, 2002

(30) Foreign Application Priority Data

Mar. 12, 2001    (JP)    ............................. 2001-068304

(51) Int. Cl.
  *G09G 5/39*    (2006.01)
  *G06F 13/00*    (2006.01)
(52) U.S. Cl. ...................... 345/531; 345/536; 345/537; 345/538
(58) Field of Classification Search ................ 345/501, 345/503, 519, 520, 531, 545, 555, 536–538; 358/1.1, 1.15, 1.16, 545, 555
See application file for complete search history.

(56) References Cited

U.S. PATENT DOCUMENTS

| | | | |
|---|---|---|---|
| 5,124,727 A * | 6/1992 | Yamazaki | 358/1.1 |
| 5,553,200 A * | 9/1996 | Accad | 358/1.15 |
| 5,864,652 A * | 1/1999 | Murahashi | 358/1.16 |
| 5,911,049 A * | 6/1999 | Watanabe | 710/100 |
| 6,208,273 B1 * | 3/2001 | Dye et al. | 341/51 |
| 6,337,746 B1 * | 1/2002 | Coyle et al. | 358/1.15 |
| 6,344,906 B1 * | 2/2002 | Gatto et al. | 358/443 |
| 6,370,631 B1 * | 4/2002 | Dye | 711/170 |
| 6,425,041 B1 * | 7/2002 | Klein | 710/306 |
| 6,564,284 B2 * | 5/2003 | Christenson | 711/5 |
| 6,618,157 B2 * | 9/2003 | Coyle et al. | 358/1.1 |
| 6,741,367 B1 * | 5/2004 | Watanabe | 358/1.15 |
| 2001/0022664 A1 * | 9/2001 | Tsuchiya | 358/1.12 |
| 2003/0194129 A1 * | 10/2003 | Metz et al. | 382/173 |

OTHER PUBLICATIONS

U.S. Appl. No. 10/427,953, filed May 2, 2003, Tanaka.

* cited by examiner

*Primary Examiner*—Kee M. Tung
*Assistant Examiner*—Hau Nguyen
(74) *Attorney, Agent, or Firm*—Oblon, Spivak, McClelland, Maier & Neustadt, P.C.

(57) ABSTRACT

An image processing apparatus operates with a high-speed print engine. An ASIC is provided between a graphics port and a peripheral device interconnection port. The print engine is connected to the peripheral device interconnection port. A memory is provided on a side of the CPU with respect to the graphics port. A CPU processes image data and stores the image data in the memory. The CPU transfers the image data stored in the memory to the print engine directly through the graphics port, the ASIC and the peripheral device interconnection port.

18 Claims, 10 Drawing Sheets

IMAGE PROCESSING APPARATUS

BACKGROUND OF THE INVENTION

1. Field of the Invention

The present invention generally relates to image-forming apparatuses and, more particularly to an image forming apparatus having a high-speed print engine.

2. Description of the Related Art

In an image processing apparatus, a memory for storing drawing data may be connected to a print engine via an application specification integrated circuit (ASIC) connected to an interface (hereinafter abbreviated as I/F) referred to as an accelerated graphic interface (hereinafter abbreviated as AGP). Since the memory for storing the drawing data supplied by a central processing unit (CPU) includes a local memory (hereinafter abbreviated as MEM-C) and a memory for drawing (hereinafter abbreviated as MEM-P), there are a plurality of paths as an image path. Moreover, since an ASIC used in an image forming apparatus generally has a compression function and a data transfer function, there are plural paths for sending code data to its designation.

FIG. 1 is a block diagram of a conventional image processing apparatus. In FIG. 1, a CPU 1603 is connected to an ASIC 1602, and a program is stored in a read only memory (ROM) 1604. Upon reception of a read request for an execution code from the CPU 1603, the ASIC 1602 outputs an address to the ROM 1604 so as to read data from the ROM 1604. The read data are transferred to the CPU 1603 and processed by the CPU 1603.

A controller 1601 is connected to the engine 1610 through the PCI 1609. The CPU 1603 interprets a drawing command written by a page-description language, which is received from a host I/F 1606, and carry out drawing on a page buffer 1611 reserved in a MEM-C 1605. After the drawing on the page buffer 1611 is completed, a command is sent to the engine 1610. Then, the engine 1610 reads image data from the page buffer 1611 of the MEM-C 1605.

Additionally, the data of the page buffer 1611 is stored in a hard disk (HDD) 1608 for jam backup. Moreover, if needed, a message is displayed on an operation part 1607, and a response of a user is received through the operation part 1607.

In the above-mentioned structure, the engine 1610 may become a bus master of the PCI 1609 so as to read image data. At this time, if the image data is in the memory for drawing, it takes a relatively long time to transfer the image data to the engine 1610 due to a response of an AGP bus. Therefore, if the engine 1610 is a high-speed processing engine, there is a problem in that the image data cannot be stored in the memory for drawing.

SUMMARY OF THE INVENTION

It is a general object of the present invention to provide an improved and useful image processing apparatus in which the above-mentioned problem is eliminated.

A more specific object of the present invention is to provide an image processing apparatus which can coop with a high-speed engine.

In order to achieve the above-mentioned object, there is provided according to one aspect of the present invention an image forming apparatus comprising: a processing unit processing image data; an interface unit between a graphics port and a peripheral device interconnection port; a print engine connected to the peripheral device interconnection port; and a first memory provided on a side of the processing unit with respect to the graphics port, wherein the processing unit stores the image data in the first memory, and transfers the image data stored in the first memory to the print engine directly through the graphics port, the interface unit and the peripheral device interconnection port.

The image forming apparatus according to the present invention may further comprise a second memory connected to the interface unit so that the second memory is connected to the first memory via the graphics port, wherein the processing unit transfers the image data from the first memory to the second memory through the graphics port so as to transfer the image data from the second memory to the print engine through the peripheral device interconnection port.

Additionally, the image forming apparatus may further comprise a compressor connected between the graphics port and the second memory and a decompressor connected to said second memory, wherein the compressor compresses the image data transferred from the first memory to the second memory so as to store the compressed image data in the second memory, and the decompressor decompresses the compressed image data and stores the decompressed image data in the second memory so as to transfer the decompressed image data from the second memory to the print engine through the peripheral device interconnection port.

The image forming apparatus according to the present invention may further comprise a decompressor connected between the graphics port and the peripheral device interconnection port, wherein the processing unit compresses the image data by using a software and stores the compressed image data in the first memory, and the decompressor decompresses the compressed image data transferred from the first memory to the print engine.

The image forming apparatus may further comprise a decompressor connected between the second memory and the peripheral device interconnection port, wherein the processing unit compresses the image data by using a software and stores the compressed image data in the first memory, and the decompressor decompresses the compressed image data stored in the second memory and sends the decompressed image data to the print engine through the peripheral device interconnection port.

The image forming apparatus according to the present invention may further comprise a decompressor connected the second memory, wherein the processing unit compresses the image data by using a software and stores the compressed image data in-the first memory, and the decompressor decompresses the compressed image data stored in the second memory and stores the decompressed image data in the second memory so that the decompressed image data is transferred from the second memory to the print engine though the peripheral device interconnection port.

Additionally, there is provided according another aspect of the present invention a method of transferring image data to a print engine through a peripheral device interconnection port, the method comprising the steps of: storing the image data in a first memory; transferring the image data from the first memory to an interface unit through a graphics port; and transferring the image data from the interface unit to the print engine through the peripheral device interconnection port.

The method according to the present invention may further comprise the steps of: transferring the image data from the first memory to a second memory through the graphics port; and transferring the image data from the second memory to the print engine through the peripheral device interconnection port.

The method according to the present invention may further comprise the steps of: compressing the image data transferred from the first memory to the second memory; storing the compressed image data in the second memory; decompressing the compressed image data stored in the second memory; storing the decompressed image data in the second memory; and transferring the decompressed image data from the second memory to the print engine through the peripheral device interconnection port.

The method according to the present invention may further comprise the steps of: compressing the image data and storing the compressed image data in the first memory; decompressing the compressed image data transferred from the first memory after passing through the graphics port; and transferring the decompressed image data to the print engine through the peripheral device interconnection port.

Additionally, the method according to the present invention may further comprise the steps of: compressing the image data and storing the compressed image data in the first memory; transferring the compressed image data from the first memory to the second memory through the graphics port; decompressing the compressed image data stored in the second memory; and transferring the decompressed image to the print engine through the peripheral device interconnection port.

Further, the method according to the present invention may further comprise the steps of: compressing the image data and storing the compressed image data in the first memory; transferring the compressed image data from the first memory to the second memory through the graphics port; decompressing the compressed image data stored in the second memory; storing the decompressed image data in the second memory; and transferring the decompressed image data from the second memory to the print engine through the peripheral device interconnection port.

Other objects, features and advantages of the present invention will become more apparent from the following detailed description when read in conjunction with the accompanying drawings.

DETAILED DESCRIPTION OF THE PREFERRED EMBODIMENTS

Figure 1:
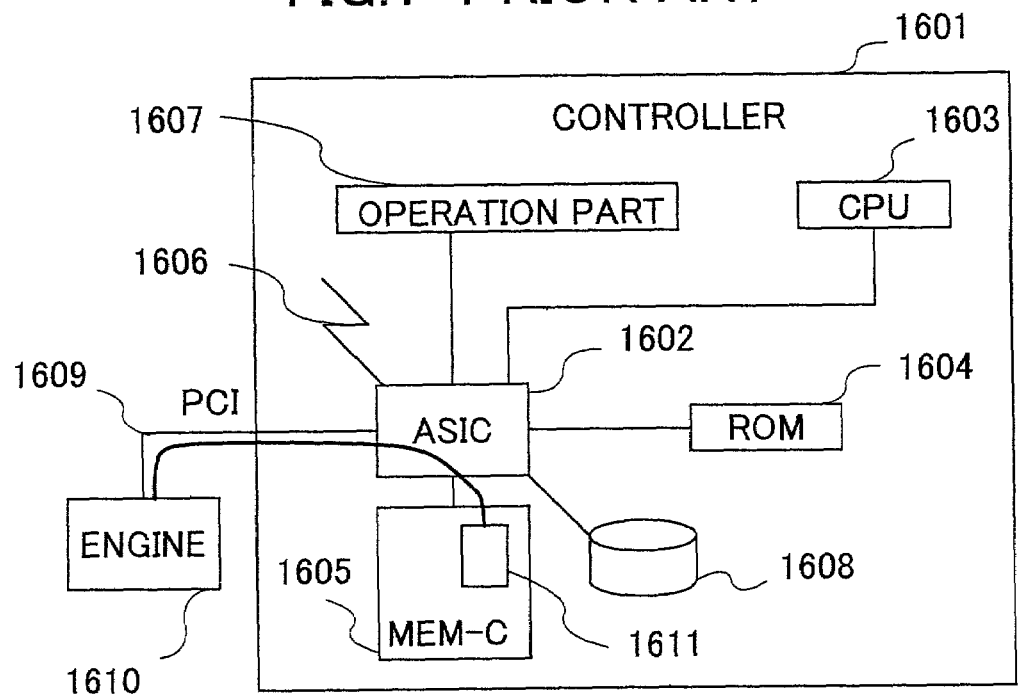
FIG. 1 is a block diagram of a conventional image processing apparatus.
Figure 2:
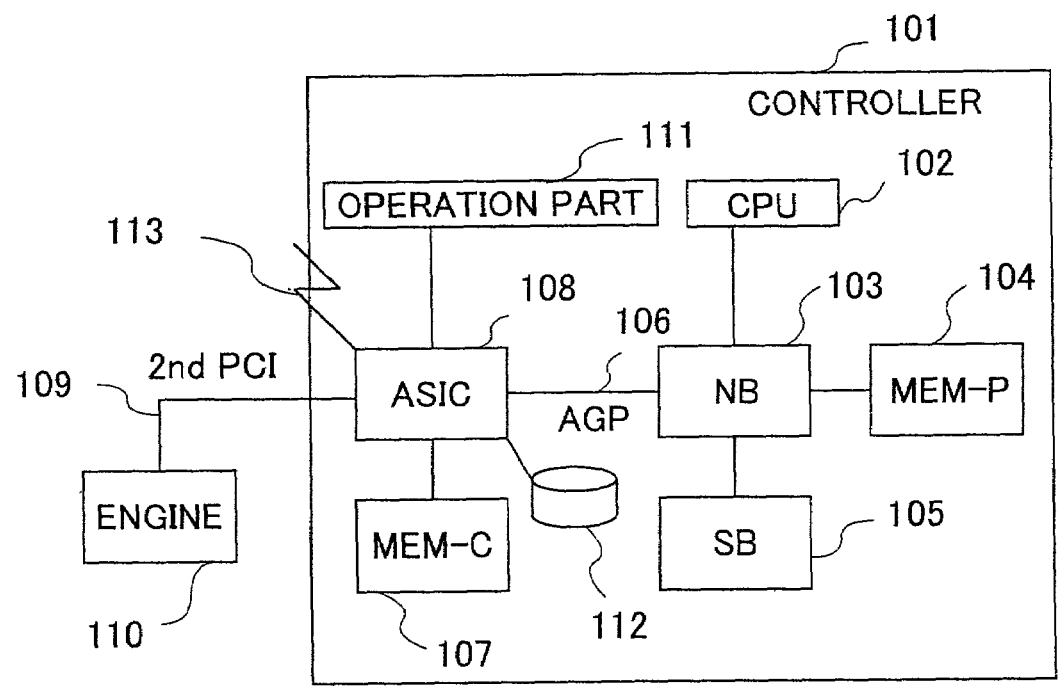
FIG. 2 is a block diagram of an image processing apparatus according to the present invention.

A description will now be given, with reference to FIG. 2, of a basic structure of an image forming apparatus according to the present invention. FIG. 2 is a block diagram of the image processing apparatus according to the present invention.

First, a description will be give of a basic operation of the image processing apparatus according to the present invention.

Figure 3:
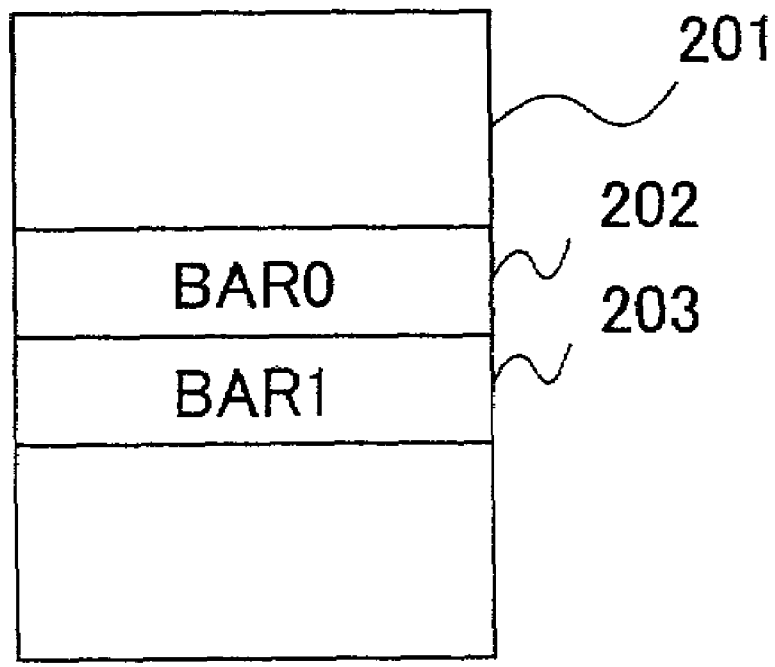
FIG. 3 is an illustration of a structure of a PCI-CONFIG register.

A print engine 110 (hereinafter, simply referred to as engine) is connected to a controller 101 through a PCI 109. If a power is supplied to the image formation apparatus, a CPU 102 starts it operation from booting of BIOS of a south bridge (hereinafter abbreviated as SB) 105, and performs initialization of a north bridge (hereinafter abbreviated as NB) 103 and initialization of the SB 105. During the initialization, the CPU 102 accesses a PCI-CONFIG register 201 of an ASIC 108 shown in FIG. 3 through an AGP 106, and sets up a base address register (hereinafter abbreviated as BAR0) 202 and a base address register (hereinafter abbreviated as BAR1) 203. Thereby, the initialization of the ASIC 108 as an AGP device is completed.

Figure 4:
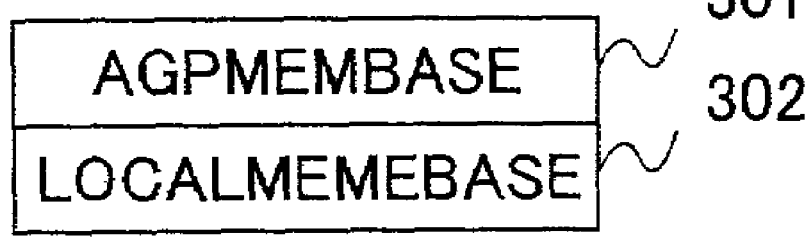
FIG. 4 is an illustration of a structure of a space base for DMAC.

After the initialization of the ASIC 108 as an AGP device is completed, an access can be made to an internal register of the ASIC 108. The internal register has an AGPMEMBASE register 301 and a LOCALMEMBASE register 302, as shown in FIG. 4. The AGPMEMBASE register 301 sets up as to which address in the ASIC a memory space 404 of the AGP shown in FIG. 4 maps.

Figure 5:
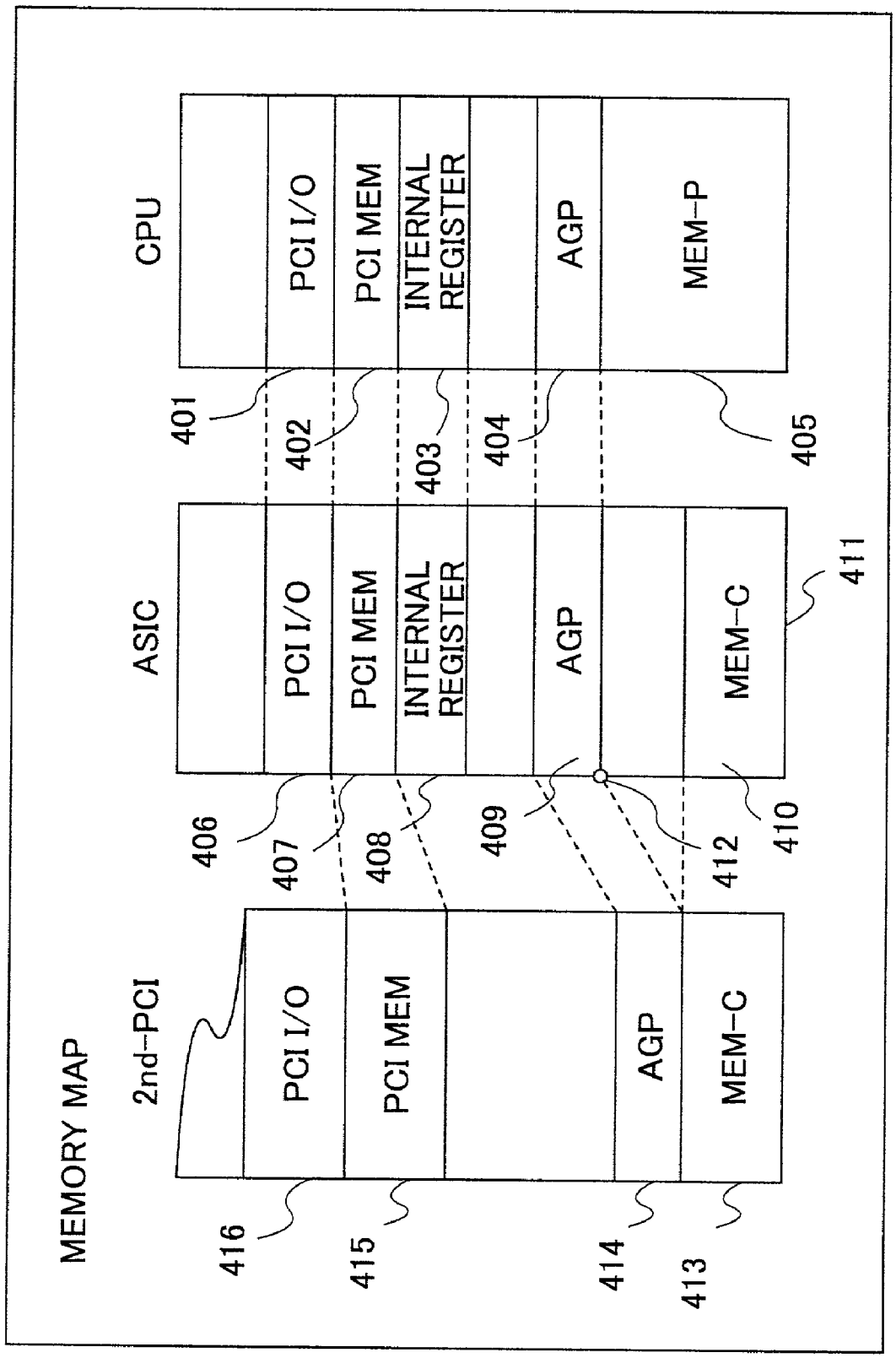
FIG. 5 is an illustration of the memory map after mapping is completed.
Figure 7:
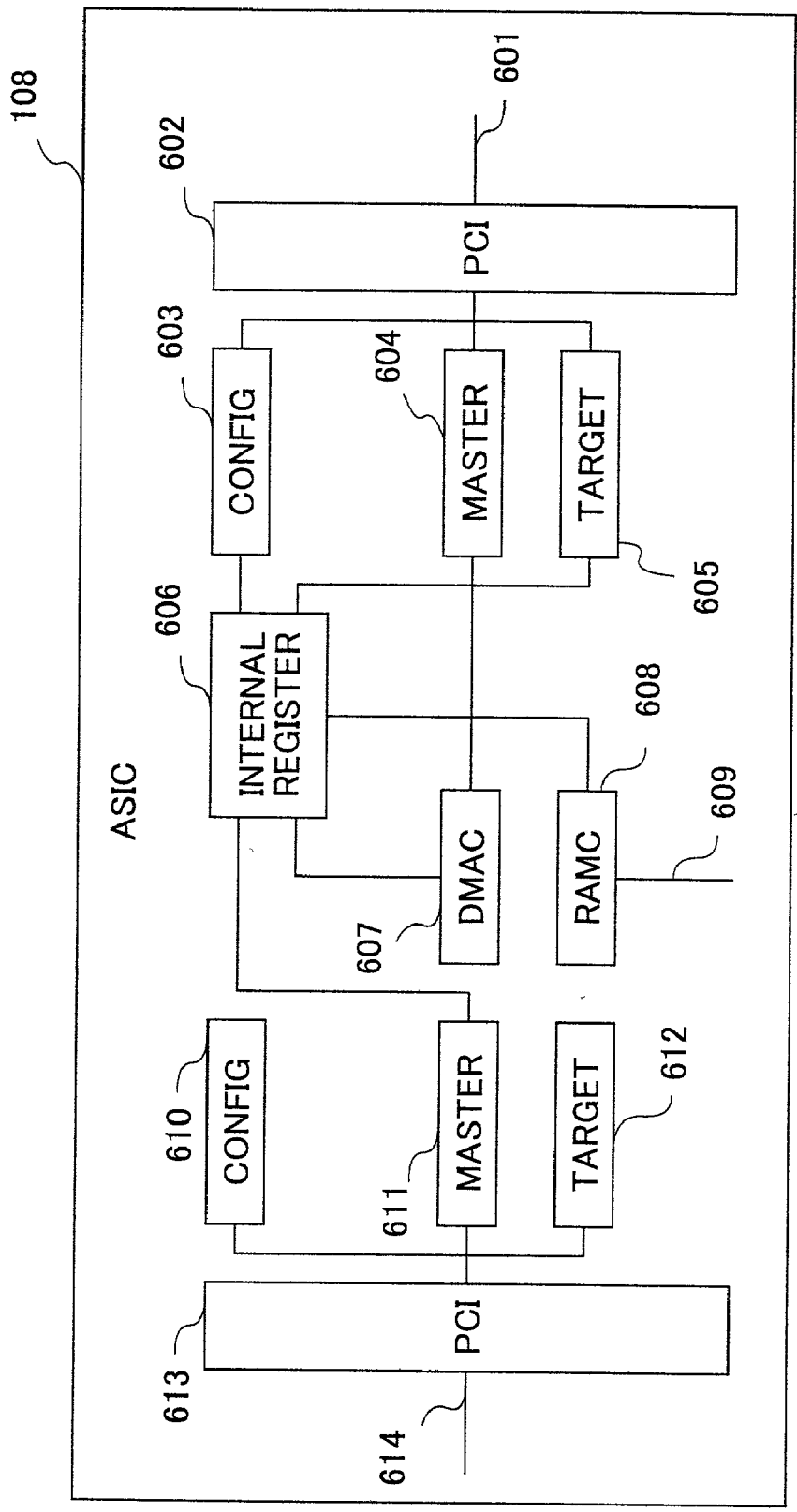
FIG. 7 is a block diagram of an ASIC shown in FIG. 2.

FIG. 5 is an illustration of the memory map after mapping is completed. When seen from the CPU, the system memory exists in the location of an MEM-P 405, and the memory space 404 of the AGP is mapped on the MEM-P 405. The memory space 404 of the AGP is set as a register of the NB 103. Thereby, the register mapped on the PCI space appears in a high order address. The internal register space 403, the memory space 402 of the PCI and the PCI I/O space 401 are set up by a BAR0 202 of a PCICONFIG space 603 shown in FIG. 7. Memory MEM-C 107 under the management of the ASIC 108 is set up by a BAR1 203. The CPU 102 can access the MEM-C 107 through the PCI. The base address set as BAR0 202 shows the head of the internal register 408. The memory space 407 and the PCI I/O space 406 of the PCI are fixedly defined by an offset with respect to a base address. If the CPU 102 accesses the memory space 407 of the PCI, the write access is postponed. Thereby, the CPU 102 is released and can start a next work.

The write access is written in the memory space 415 of the PCI of the same address of the 2nd-PCI 109. Similarly, the write access to the PCI I/O space 406 is written in the PCI I/O space 416 of the 2nd-PCI 109. Additionally, if the CPU 102 carries out read access to the memory space 402 of the PCI, the access is converted into an AGP access by the NB 103 (66 MHz of PCI). Therefore, the CPU 102 carries out the read access to the memory space 407 of the PCI of the ASIC 108. Although the ASIC 108 accesses the memory space 415 of the PCI of the 2nd-PCI 109, a retry of the AGP access by the CPU 102 is repeated since it takes a time to read the data. When the NB 103 receives the retry signal, NB 103 repeats the read access. After reading data from the 2nd-PCI 109 and preparing the data, the ASIC 108 returns data to the NB 103. The NB 103 transfers the data to the CPU 102, and the transaction is completed.

A PCI-CONFIG register exists in the engine 110 connected to the 2nd-PCI 109. Therefore, the engine PCI register of the engine 110 can be accessed by mapping the base address in somewhere in the memory space 415 of the PCI. In order to access from the engine 110, a PCI-CONFIG register exists also in the 2nd-PCI 109 of the ASIC 108. There are base registers such as a base register for accessing the AGP space 404 of the NB 103, a base register for accessing the memory MEM-C 410 under management of the ASIC 108, a base register for setting up an input address of DMAC for an image input of the ASIC 108, and a base register for setting up an output address of DMAC for an image output of the ASIC 108. The whole work is performed in the initialization process.

Figure 6:
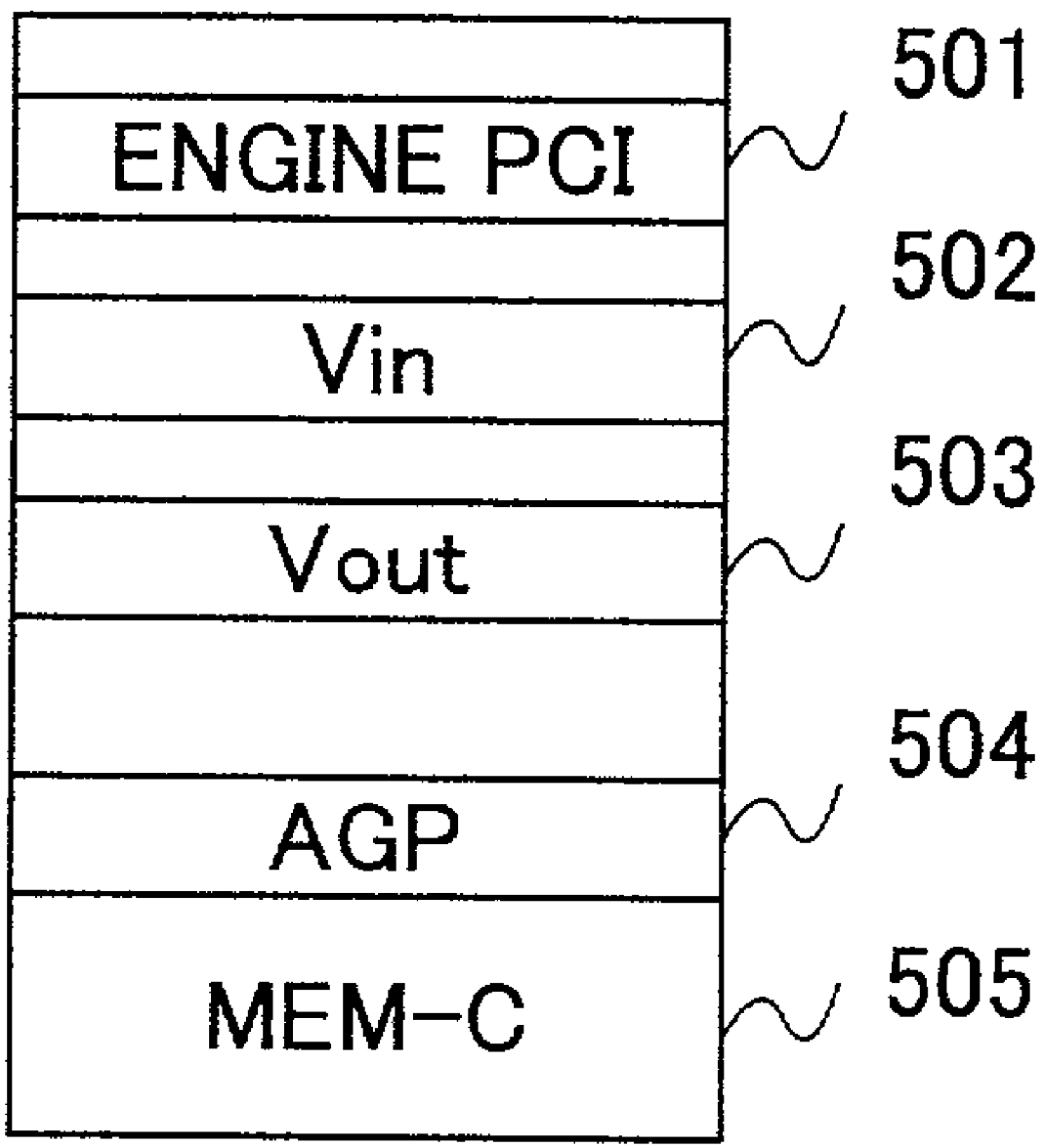
FIG. 6 is an illustration of a structure of a 2nd-OCI space.

After the mapping is completed, the memory map becomes that shown in FIG. 5, and the CPU 102 can access according to the memory map. Moreover, the engine 110 can access the memory according to the memory map shown in FIG. 6. The engine 110 also performs self-diagnostics, etc., after a power is turned on, and waits for mapping by the CPU 102. After the initialization is ended, the engine 110 becomes able to communicate with the CPU 102.

In the controller 101, an initialization of software is performed. After the initialization is completed, the message indicating that a print can be started is displayed on the operation part 111, and a standby state is set up in preparation for reception of data from the host. The ASIC 108 is provided with an interface I/F, such as a network, IEEE1394 or USB, so as to connect with a host. When reception of data starts, the ASIC 108 sequentially interprets the sent data, and starts drawing an image on the MEM-P 104. When the drawing is completed, the ASIC 108 sends a command to the engine 110 so as to instruct the engine 110 to take the image data that was drawn. In order to show the data of the MEM-P104 in the space of the AGP 404, the CPU 102 operates the internal register of the NB 103 so as to rewrite a table on the memory to set up a state where the AGP space 414 can be seen from the engine 110. The engine 110 acquires the read address of a buffer in which the drawn image data is stored, and starts the DMAC inside the engine 110 so as to read the image data of the MEM-P 405 through the AGP 414. At this time, the ASIC 108 performs a target operation with respect to the 2nd-PCI, and performs a master operation with respect to the AGP 106. The engine 110 reads the image data according to a timing signal generated therein.

Next, a description will be given of an operation of the engine 110.

Figure 8:
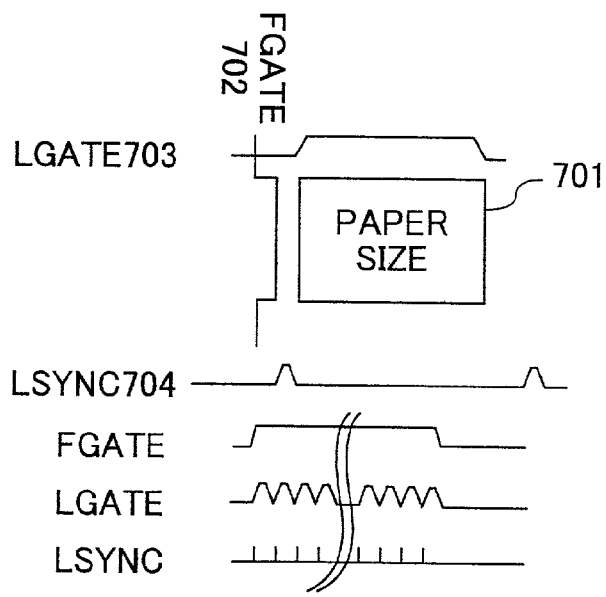
FIG. 8 is a time chart of a reading operation in an engine shown in FIG. 2.

The engine 110 shown in FIG. 2 operates according to the timing chart shown in FIG. 8. The engine 110 generates, in accordance with the size of a print paper 701 to be output, a signal LSYNC 704 which expresses a start of a line at the head of each scanning line, a signal FGATE 702 which expresses an effective area in a secondary scanning direction, a signal LGATE 703 which expresses an effective area in a primary scanning direction. Upon reception of a print command, the engine 110 conveys a print paper and generates the signal FGATE 702 simultaneously. Then, the engine 110 starts a transfer operation a predetermined time before the signal FGATE 702 is asserted so as to store the image data in an internal buffer, the predetermined time corresponding to several periods of LSYNC 704.

Figure 9:
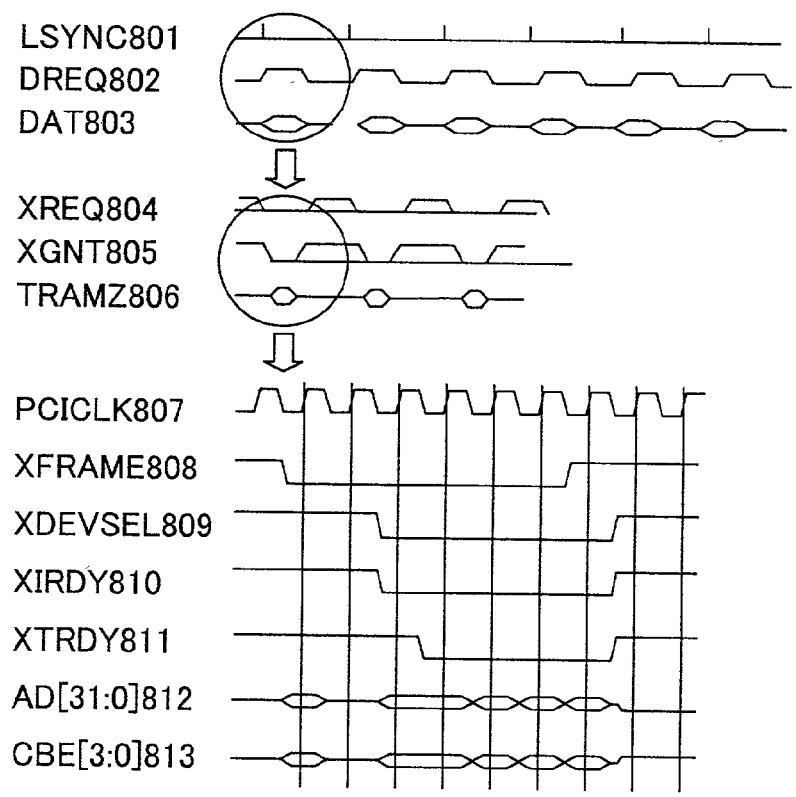
FIG. 9 is a time chart if a transfer operation of a PCI shown in FIG. 2.

As shown in FIG. 9, at a time of rising of LSYNC 801, a data transmission request DREQ 802 is asserted and the transmission of DATA 803 for one line is completed. Data transmission for one line is performed in synchronization with each LSYNC 801. On the 2nd-PCI 109, when XREQ 804 is asserted and use of a bus is permitted, XGNT 805 is asserted. Thereby, one transaction 806 through the PCI is performed. The transaction through the PCI is repeated until the data transmission for one line is completed. Each transaction 806 of the PCI is performed by a burst transfer. The signal of the PCI synchronizes with the rising of PCICLK 807.

When permission of use of the bus is given, the engine 110, which is a bus master, asserts XFRAME, and issue an address AD[31:0] 812 and a command CBE[3:0] 813 simultaneously. The ASIC 108 asserts XDEVSEL 809 if the address AD [31:0] issued by the engine 110 hits a base address register of its own. If the engine 110 can receive data, the engine 110 assets EIRDY after confirming assertion of XDEVSEL 809 so as to notify the ASIC 108 as a target that reception of data is possible. If data regarding command CBE[3:0] 813 has been prepared, the ASIC 108 asserts XTRDY and sends the data to the bus. Then, if data to be sent remains, the ASIC 108 continuously transmits one piece of data per one clock in synchronization with PCICLK 807.

Figure 10:
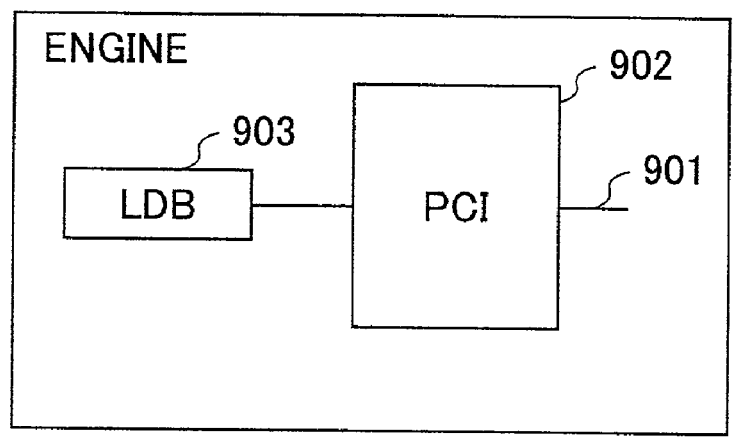
FIG. 10 is a block diagram of an engine shown in FIG. 2.

Then, the engine 110 as a bus master negates PCICLK 807 one clock prior to the last piece of data so as to indicate that the next piece of data is the last data of the current transaction. After completion of the data transfer, the ASIC 108 negates XDEVSEL 809 and XTRDY 811. Then, the engine 110 negates XTRDY 810, and completes the transaction. It should be noted that FIG. 10 is a block diagram shown in an internal structure of the engine 110, in which a convey system is omitted.

Figure 11:
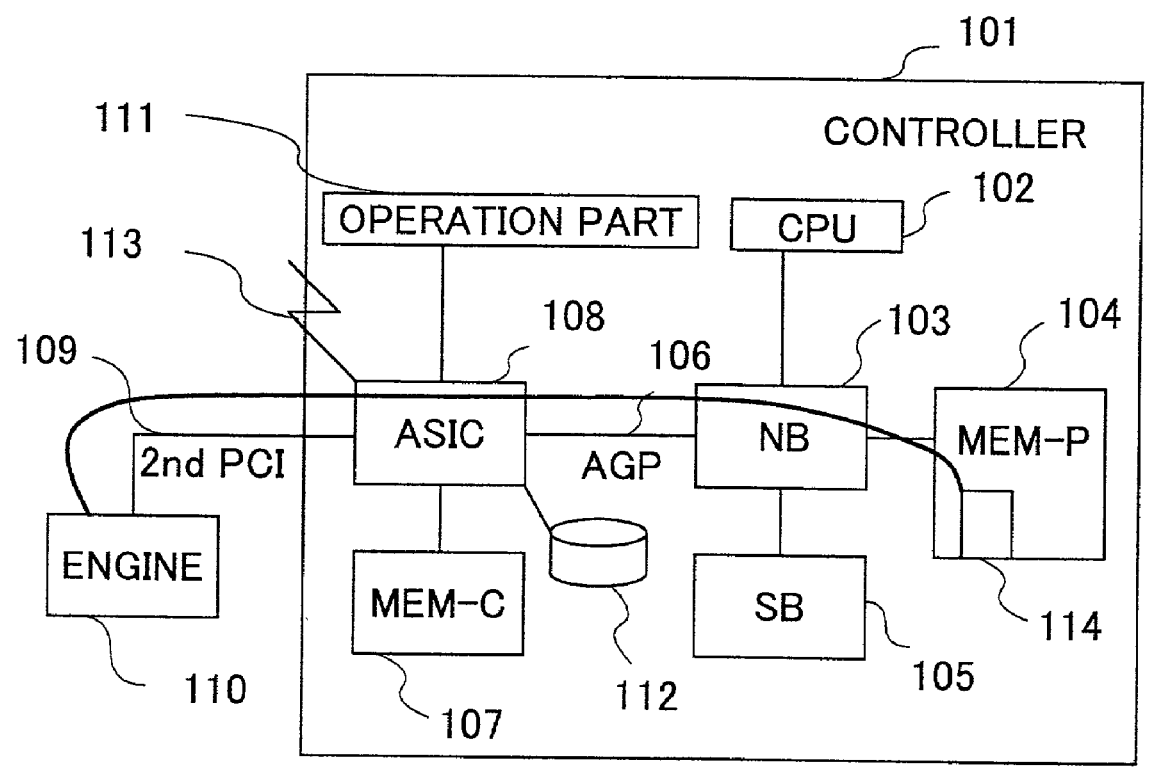
FIG. 11 is a block diagram of an image forming apparatus according to a first embodiment of the present invention.

FIG. 11 is a block diagram showing a structure of an image processing apparatus according to a first embodiment of the present invention. In FIG. 11, parts that are the same as the parts shown in FIG. 2 are given the same reference numerals, and descriptions thereof will be omitted. Although not illustrated in the figure, a program is stored in a ROM provided on the bus between the NB 103 and the SB 105. The program read from the ROM is stored in the MEM-P 104, and is executed. The program and data are stored in the MEM-P 104, and further a page buffer 114 for drawing is reserved in the MEM-P 104.

In the present embodiment, the CPU 102 receives a drawing command from the host I/F 113, and draws an image on the page buffer 114. When the drawing is completed, the CPU 102 issues an output command to the engine 110. The engine 110 reads out the image data of the MEM-P 114 via ASIC 108 and through the AGP 106 and the 2nd-PCI 109. Therefore, although a controller 101 has a very simple structure, the engine 110 can read the image data stored in the MEM-P 114 very quickly.

Figure 12:
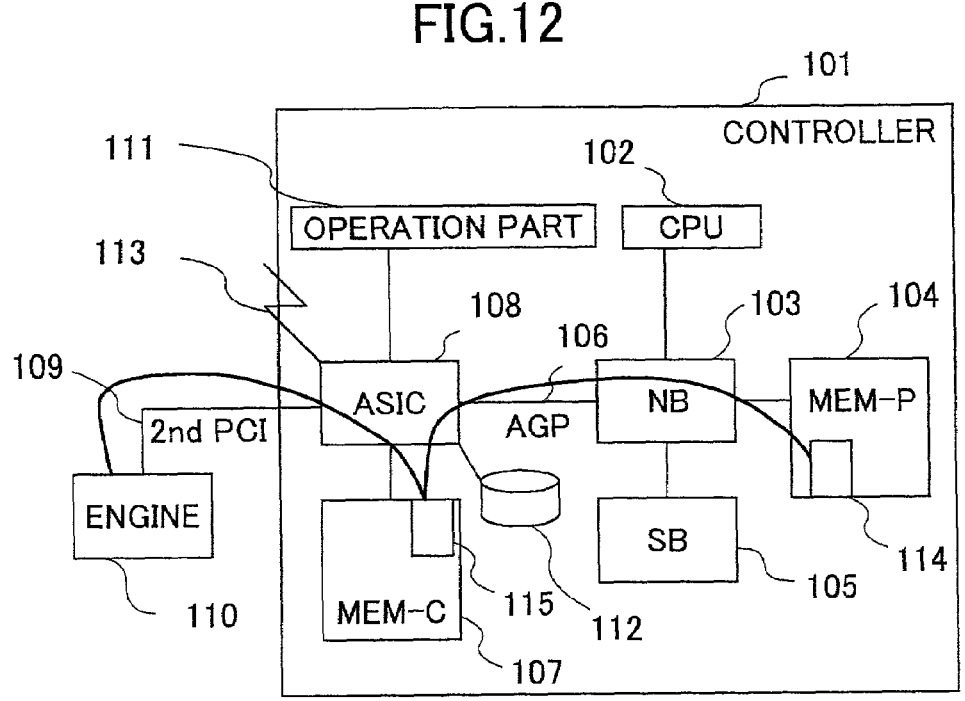
FIG. 12 is a block diagram of an image forming apparatus according to a second embodiment of the present invention.

FIG. 12 is a block diagram showing a structure of an image processing apparatus according to a second embodiment of the present invention. In FIG. 12, parts that are the same as the parts shown in FIG. 11 are given the same reference numerals, and descriptions thereof will be omitted.

The CPU 102 receives a drawing command from the host I/F 113, and draws an image on the page buffer 114. After completion of the drawing, the image data is transferred from the MEM-P 104 to the MEM-C 107 by using the DMAC of the ASIC 108. After the transmission is completed, an output command is sent to the engine 110. Then, the engine 110 reads the image data of the page buffer 115 of the MEM-C 107 via the ASIC 108.

As mentioned above, in the present embodiment, the image data of the MEM-P 104 is transferred to and stored in the MEM-C 107 before the image data is read by the engine 110 so that the image data can be read based on a high-speed operation of the engine 110. That is, the engine 110 can read the image data without passing through the AGP, which may restrict the data transfer speed.

Figure 13:
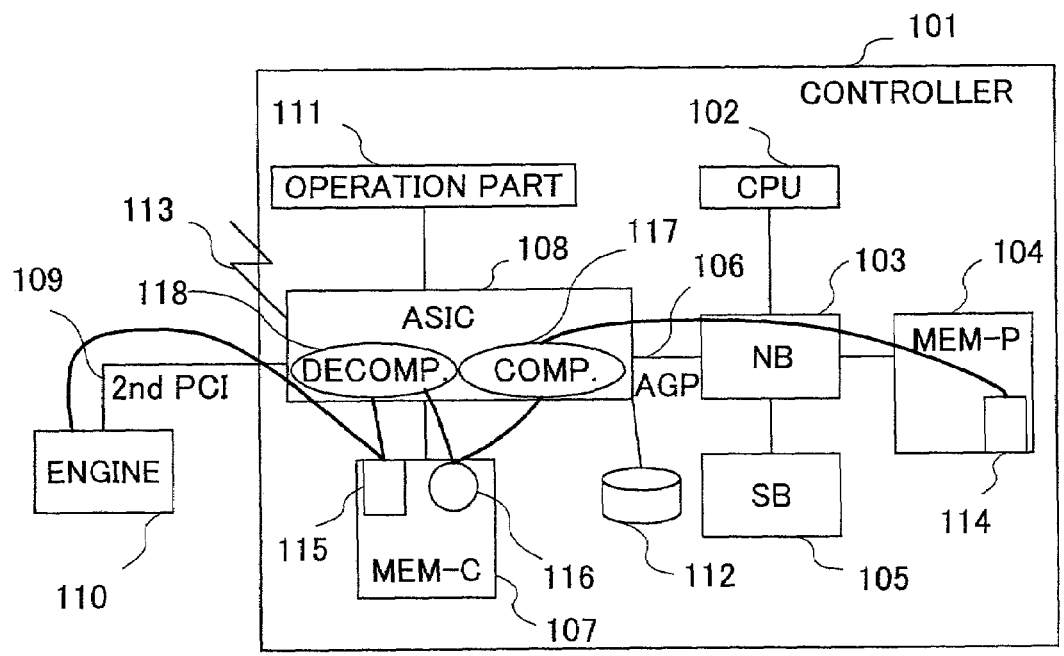
FIG. 13 is a block diagram of an image forming apparatus according to a third embodiment of the present invention.

FIG. 13 is a block diagram showing a structure of an image processing apparatus according to a third embodiment of the present invention. In FIG. 13, parts that are the same as the parts shown in FIG. 12 are given the same reference numerals, and descriptions thereof will be omitted.

The CPU 102 receives a drawing command from the host I/F 113, and draws an image on the page buffer 114. After the drawing is completed, the CPU 102 reads the image data from the page buffer 114 of the MEM-P 104, and compresses the image data by using a compressor 117 provided in the ASIC 108. Then, the CPU 102 stores the result of the compression, which is a compression code 116, in the MEM-C 107. After the compression of the image data corresponding to one page is completed, the compression code 116 is read and decompressed by a decompressor 118 provided in the ASIC 108. The decompressed image data, is stored in the page buffer 115 of the MEM-C 107. Thereafter, an output command is issued to the engine 110. Thus, the engine 110 reads the image data of the page buffer 115 of the MEM-C 107 via the ASIC 108.

As mentioned above, in the present embodiment, the image data of the MEM-P 104 is transferred to and stored in the MEM-C 107 before the image data is read by the engine 110 so that the image data can be read based on a high-speed operation of the engine 110. That is, the engine 110 can read the image data without passing through the AGP, which may restrict the data transfer speed. Additionally, in the present embodiment, the image data to be stored is decompressed by the decompressor 118 so as to increase an amount of image data stored in the MEM-C 107. The compressed image data in the MEM-C 107 is decompressed at an appropriate timing, and is output to the engine 110.

Figure 14:
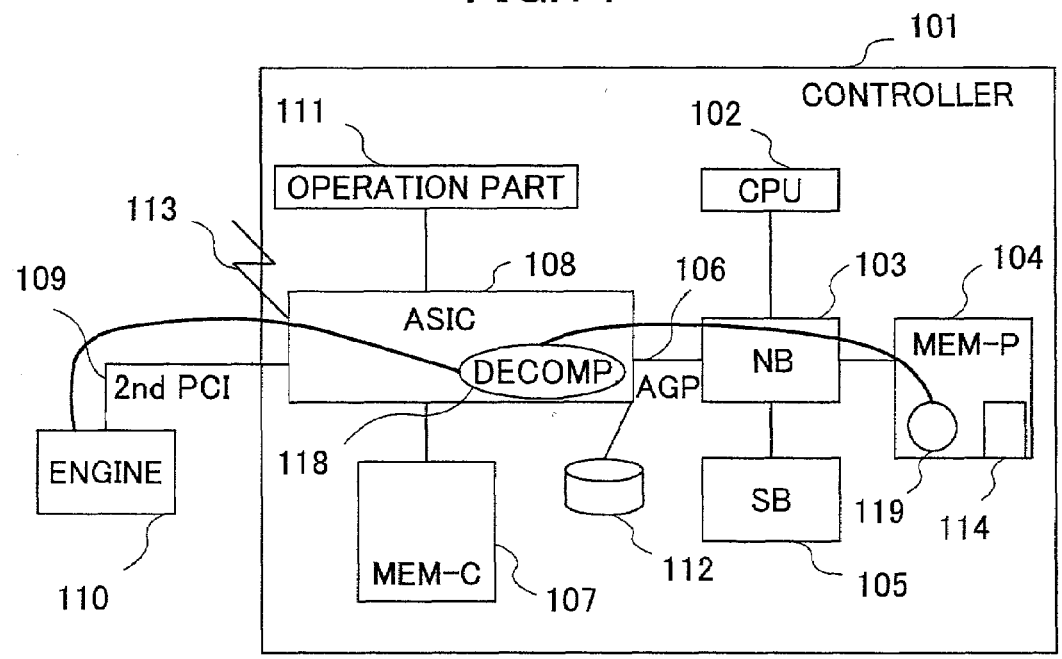
FIG. 14 is a block diagram of an image forming apparatus according to a fourth embodiment of the present invention.

FIG. 14 is a block diagram showing a structure of an image processing apparatus according to a fourth embodiment of the present invention. In FIG. 14, parts that are the same as the parts shown in FIG. 13 are given the same reference numerals, and descriptions thereof will be omitted.

The CPU 102 receives a drawing command from the host I/F 113, and draws an image on the page buffer 114. After the drawing is completed, the CPU 102 reads and compresses the image of the page buffer 114 of the MEM-P 104 according to a program, and stores the compression code 119 in the MEM-P 104. After the compression is completed, the CPU 102 issues an output command to the engine 110. When the engine 110 reads the image data, the decompressor 118 of the ASIC 108 reads and decompresses the compression code 119 of the MEM-P 104. Then, the ASIC 108 outputs the decompressed image data to the engine 110 through the 2nd-PCI 109. In the present embodiment, the compressed image data is transmitted to the ASIC 108 via the AGP 106.

That is, since the image data is passed though the AGP 106, which provides a relatively low-speed interface, in the compressed state, the data transfer rate of the image data is substantially increased with respect to the AGP 106. That is, even if an amount of the image data read via the AGP 106 is small, the image data can be output from the ASIC 108 to the engine 110 at timing appropriate for the high-speed engine 110 since the amount of image data after decompression becomes large.

Figure 15:
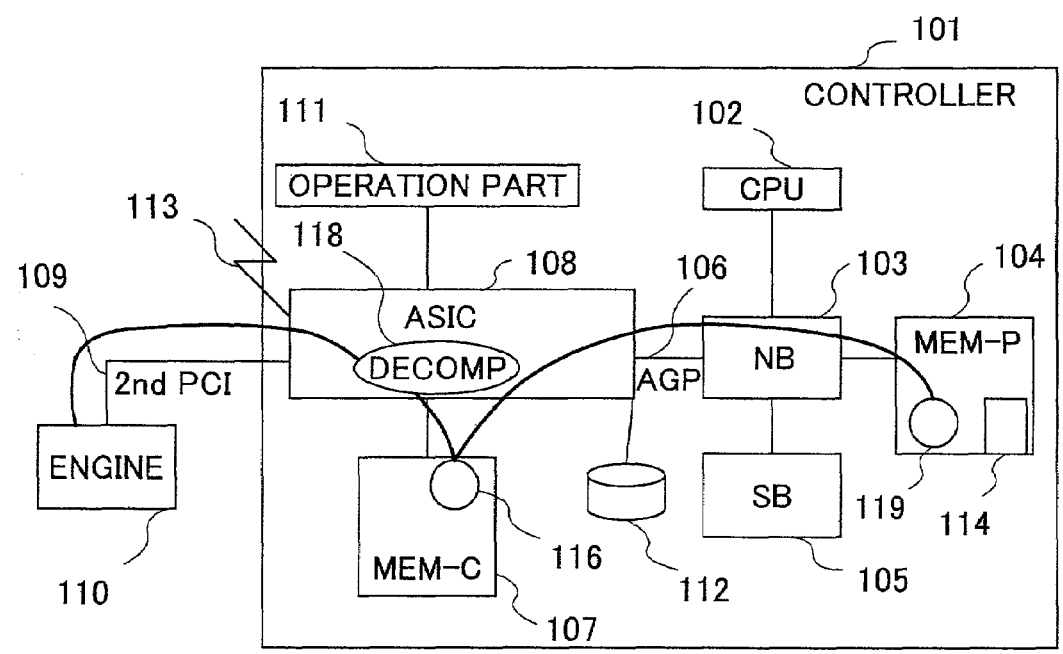
FIG. 15 is a block diagram of an image forming apparatus according to a fifth embodiment of the present invention.

FIG. 15 is a block diagram showing a structure of an image processing apparatus according to a fifth embodiment of the present invention. In FIG. 15, parts that are the same as the parts shown in FIG. 14 are given the same reference numerals, and descriptions thereof will be omitted.

The CPU 102 receives a drawing command from the host I/F 113, and draws an image on the page buffer 114. After the drawing is completed, the CPU 102 reads and compresses the image of the page buffer 114 of the MEM-P 104 according to a program, and stores the compression code 119 in the MEM-P 104. After the compression is completed, the CPU 102 transfers the compression code 120 of the MEM-P 104 to the MEM-C 107 by using the DMAC of the ASIC 108. Thereafter, the CPU 102 issues an output command to the engine 110. When the engine 110 reads the image data, the decompressor 118 of the ASIC 108 reads and decompresses the compression code 116 of the MEM-C 107, and transfers the decompressed image data to the engine 110.

That is, since the image data is passed though the AGP 106, which provides a relatively low-speed interface, in the compressed state, the data transfer rate of the image data is substantially increased with respect to the AGP 106. That is, even if an amount of the image data read via the AGP 106 is small, the image data can be output from the ASIC 108 to the engine 110 at timing appropriate for the high-speed engine 110 since the amount of image data after decompression becomes large. Additionally, in the present embodiment, a large amount of image data can be stored in the MEM-C 107 since the imaged data transferred from the MEM-P 104 has been compressed.

Figure 16:
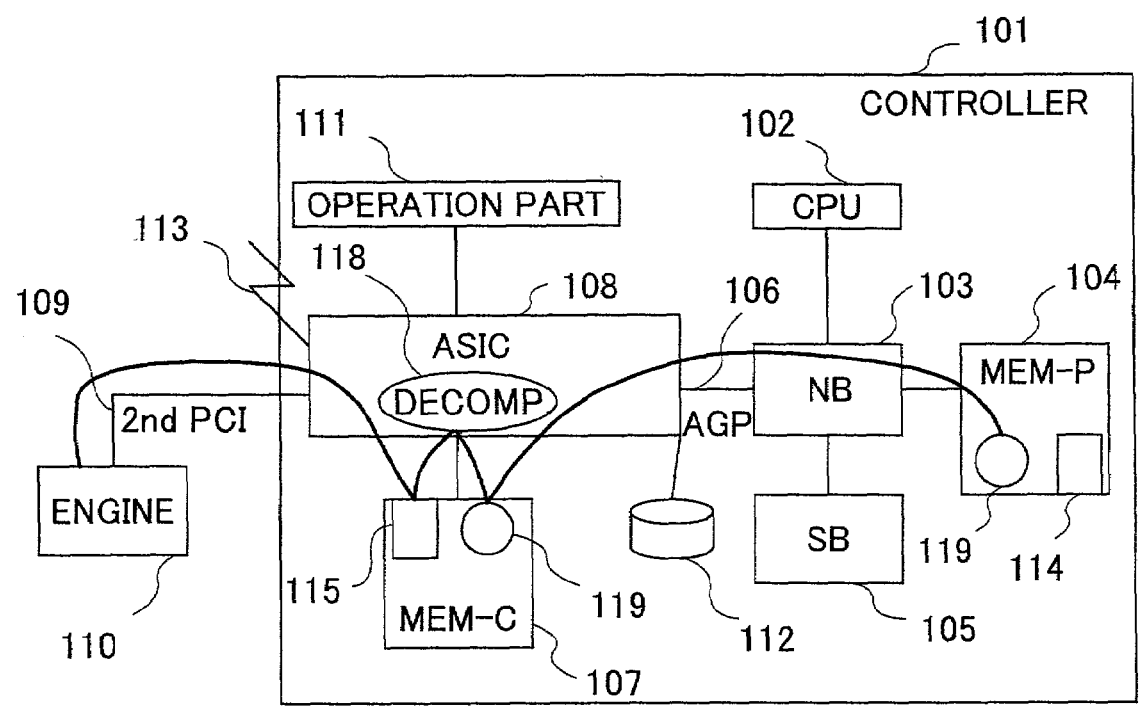
FIG. 16 is a block diagram of an image forming apparatus according to a sixth embodiment of the present invention.

FIG. 16 is a block diagram showing a structure of an image processing apparatus according to a sixth embodiment of the present invention. In FIG. 16, parts that are the same as the parts shown in FIG. 15 are given the same reference numerals, and descriptions thereof will be omitted.

The CPU 102 receives a drawing command from the host I/F 113, and draws an image on the page buffer 114. After the drawing is completed, the CPU 102 reads and compresses the image data of the page buffer 114 of the MEM-P 104 according to a program. The CPU 102 stores in the MEM-P 104 the compression code 119, which is a result of the compression. After the compression is completed, the CPU 102 transfers the compression code 119 of the MEM-P 104 to MEM-C 107 by using the DMAC of the ASIC 108. Prior to outputting the image data to the engine 110, the ASIC 108 decompresses the compression code 119, and stores the decompressed image data in the page buffer 115. Then, the CPU 102 issues an output command to the engine 110. The engine 110 reads the image data from the page buffer 115 via the ASIC 108.

In the present embodiment, in order to make the read-out operation to match the high-speed engine, the compressed image data is stored in the MEM-P 104 as the compression code 119. Since the data read via the AGP 106 are the compression code, an amount of image data transferred to the MEM-C 107 is reduced. That is, the transfer rate through the AGP 106 is increased substantially. However, when the engine 110 operates at an extremely high-speed, the decompression rate of the decompressor 118 may be insufficient, and the decompressed image data cannot be transferred to the engine 110 simultaneously with the decompression, which may result in deterioration of image. Therefore, in the present embodiment, the image data is directly read from the MEM-C 107 so that data can be read faster than the decompression rate of the decompressor 118. Accordingly, the image data can be output to the engine 110 at a timing, which matches the high-speed operation of the engine 110.

The present invention is not limited to the specifically disclosed embodiments, and variations and modifications may be made without departing from the scope of the present invention.

The present application is based on Japanese priority application No. 2001-068304 filed on Mar. 12, 2001, the entire contents of which are hereby incorporated by reference.

What is claimed is:

1. An image forming apparatus for processing image data, comprising:
    an image data processing unit including a graphics port and a peripheral device interconnection port, the peripheral device interconnection port configured to be connected to a print engine;
    a first image data memory configured to store compressed image data;
    a second image data memory configured to communicate with the first image data memory; and
    a unit connected to the graphics port of the image data processing unit and having a function to interface between the image data processing unit and the first image data memory,
    wherein the first image data memory is connected to the image data processing unit via the unit, and the second memory is connected to the image data processing unit, not via the unit,
    wherein the compressed image data is controlled to be transferred from the first image data memory to the second image data memory, and then from the second image data memory to the image data processing unit, and wherein the image data processing unit decompresses the transferred compressed image data and outputs the decompressed image data to the print engine.

2. The image forming apparatus as claimed in claim 1, wherein the first image data memory stores compressed image data.

3. The image forming apparatus as claimed in claim 1, wherein the image data processing unit further includes an interface with a second image data memory, and the image data processing unit outputs image data stored in the second image data memory, the image data stored in the second image data memory being transferred from the first image data memory to the second image data memory through the interface of the image data processing unit.

4. The image forming apparatus as claimed in claim 3, wherein the image data processing unit reads compressed image data from the second image data memory, and decompresses the read compressed image data and outputs the decompressed image data to the print engine.

5. An image forming apparatus for processing image data, comprising:
    an image data processing unit including a graphics port and a peripheral device interconnection port, the peripheral device interconnection port configured to be connected to a print engine;
    a first image data memory configured to store compressed image data;
    a second image data memory configured to communicate with the first image data memory; and
    means, connected to the graphics port of the image data processing unit, for interfacing between the image data processing unit and the first image data memory,
    wherein the first image data memory is connected to the image data processing unit via the means for interfacing, and the second memory is connected to the image data processing unit, not via the means for interfacing,
    wherein the compressed image data is controlled to be transferred from the first image data memory to the second image data memory, and then from the second image data memory to the image data processing unit, and wherein the image data processing unit decompresses the transferred compressed image data and outputs the decompressed image data to the print engine.

6. The image forming apparatus as claimed in claim 5, wherein the first image data memory stores compressed image data.

7. The image forming apparatus as claimed in claim 5, wherein the image data processing unit further includes an interface with a second image data memory, and the image data processing unit outputs image data stored in the second image data memory, the image data stored in the second image data memory being transferred from the first image data memory to the second image data memory through the interface of the image data processing unit.

8. The image forming apparatus as claimed in claim 7, wherein the image data processing unit reads compressed image data from the second image data memory, and decompresses the read compressed image data and outputs the decompressed image data to the print engine.

9. A method of transferring image data to a print engine in an image data processing unit including a graphics port and a peripheral device interconnection port, the peripheral device interconnection port configured to be connected to a print engine, the method comprising:
    storing compressed image data in a first image data memory;
    interfacing, through a unit connected to the graphics port of the image data processing unit, between the image data processing unit and the first image data memory; and p1 transferring the compressed image data from the first image data memory to a second image data memory communicating with the first memory, and then from the second image data memory to the image data processing unit, and wherein the image data processing unit decompresses the transferred compressed image data and outputs the decompressed image data to the print engine,
    wherein the first image data memory is connected to the image data processing unit via the unit, and the second memory is connected to the image data processing unit, not via the unit.

10. The image forming method as claimed in claim 9, wherein the first image data memory stores compressed image data.

11. The image forming method as claimed in claim 9, wherein the image data processing unit further includes an interface with a second image data memory, and the method further comprising:
    outputting by the image data processing unit, image data stored in the second image data memory, and transferring the image data stored in the second image data memory from the first image data memory to the second image data memory through the interface of the image data processing unit.

12. The image forming method as claimed in claim 11, further comprising: p1 reading, by the image data processing unit, compressed image data from the second image data memory, and decompressing the read compressed image data and outputting the decompressed image data to the print engine.

13. An image forming apparatus for processing image data, comprising:
    an image data processing unit including a graphics port and a peripheral device interconnection port, the peripheral device interconnection port configured to be connected to a print engine;
    a first image data memory connected to the graphics port and configured to store image data compressed; and
    a second image data memory configured to communicate with the first image data memory, wherein the second memory is directly connected to the image data processing unit,
    wherein the compressed image data is controlled to be transferred from the first image data memory to the second image data memory, and then from the second image data memory to the image data processing unit, and wherein the image data processing unit decompresses the transferred compressed image data and outputs the decompressed image data to the print engine.

14. An image forming apparatus for processing image data, comprising:
    an image data processing unit including a graphics port and a peripheral device interconnection port, the peripheral device interconnection port configured to be connected to a print engine;
    first means, connected to the graphics port, for storing compressed image data; and
    second means for storing image data and communicating with the first means for storing, wherein the second memory is directly connected to the image data processing unit,
    wherein the compressed image data is controlled to be transferred from the first means for storing to the second means for storing, and then from the second means for storing to the image data processing unit, and wherein the image data processing unit decompresses the transferred compressed image data and outputs the decompressed image data to the print engine.

15. An image forming apparatus for processing image data, comprising:
    an image data processing unit including a graphics port and a peripheral device interconnection port, the peripheral device interconnection port configured to be connected to a print engine;
    a first image data memory connected to the graphics port and configured to store compressed image data; and
    a second image data memory configured to communicate with the first image data memory, wherein the second memory is directly connected to the image data processing unit,
    wherein the compressed image data is controlled to be transferred from the first image data memory to the second image data memory, and then from the second image data memory to the image data processing unit, and wherein the image data processing unit decompresses the transferred compressed image data and outputs the decompressed image data in accordance with an output timing to output the decompressed image data to the print engine.

16. An image forming apparatus for processing image data, comprising:
    an image data processing unit including a graphics port and a peripheral device interconnection port, the peripheral device interconnection port configured to be connected to a print engine;
    first means, connected to the graphics port, for storing image data; and
    second means for storing image data and communicating with the first means for storing, wherein the second memory is directly connected to the image data processing unit,
    wherein the compressed image data is controlled to be transferred from the first means for storing to the second means for storing, and then from the second means for storing to the image data processing unit, and wherein the image data processing unit decompresses the transferred compressed image data and outputs the decompressed image data in accordance with an output timing to output the decompressed image data to the print engine.

17. An image forming apparatus for processing image data, comprising:
    an image data processing unit including a graphics port and a peripheral device interconnection port, the peripheral device interconnection port configured to be connected to a print engine;
    a first image data memory connected to the graphics port and configured to store non-compressed image data; and
    a second image data memory configured to communicate with the first image data memory, wherein the second memory is directly connected to the image data processing unit,
    wherein the non-compressed image data is controlled to be transferred from the first image data memory to the image data processing unit, and the image data processing unit then compresses the image data and provides the compressed image data to the second image data memory, and wherein the image data processing unit retrieves the compressed image data from the second image data memory and decompresses the retrieved compressed image data and outputs the decompressed image data to the print engine.

18. An image forming apparatus for processing image data, comprising:
    an image data processing unit including a graphics port and a peripheral device interconnection port, the peripheral device interconnection port configured to be connected to a print engine;
    first means, connected to the graphics port, for storing compressed image data; and
    second means for storing image data and communicating with the first means for storing, wherein the second memory is directly connected to the image data processing unit,
    wherein the compressed image data is controlled to be transferred from the first means for storing to the image data processing unit, and the image data processing unit then compresses the image data and provides the compressed image data to the second image data memory, and wherein the image data processing unit retrieves the compressed image data from the second means for storing and decompresses the retrieved compressed image data and outputs the decompressed image data to the print engine.

* * * * *